United States Patent [19]

Poggemiller et al.

[11] 4,031,963
[45] June 28, 1977

[54] DEPTH CONTROL DEVICE FOR GROUND WORKING AGRICULTURAL IMPLEMENTS

[76] Inventors: Erhard Poggemiller, Box 128, Luseland, Saskatchewan; Ralph Sweet, Box 3, Forgan, Saskatchewan, both of Canada

[22] Filed: Apr. 14, 1975

[21] Appl. No.: 567,624

[52] U.S. Cl. .............................. 172/4; 56/DIG. 15
[51] Int. Cl.² ............... A01B 63/114; A01B 63/12; A01B 65/06
[58] Field of Search ............. 172/4, 7, 9, 126, 239, 172/311, 397, 398, 407, 408, 410, 411, 413, 456, 580, 663, 668; 200/153 T; 56/DIG. 15; 37/DIG. 1; 404/84

[56] References Cited

UNITED STATES PATENTS

| | | | |
|---|---|---|---|
| 3,396,803 | 8/1968 | Corni | 172/7 |
| 3,520,369 | 7/1970 | Nicholson | 172/7 |
| 3,524,508 | 8/1970 | West | 172/126 |
| 3,572,305 | 3/1971 | Moragne | 200/153 T X |
| 3,658,133 | 4/1972 | Sweet et al. | 172/4 |
| 3,736,988 | 6/1973 | Cantral et al. | 172/7 |

FOREIGN PATENTS OR APPLICATIONS

| | | | |
|---|---|---|---|
| 40,888 | 7/1958 | Poland | 172/4 |
| 1,180,355 | 2/1970 | United Kingdom | 200/153 T |

*Primary Examiner*—Richard T. Stouffer
*Attorney, Agent, or Firm*—Stanley G. Ade

[57] ABSTRACT

A depth control device is attached to agricultural implements such as cultivators, seed drills, discers and the like, in order to control, within pre-determined limits, the depth of penetration of the earth working components. It comprises firstly a ground or surface-engaging sensing member extending forwardly of the framework and secondly, a sensor that is connected to the earth working components. Both of these sensors are connected to an hydraulic electrical or mechanical device to raise and lower the earth working components which controls the depth of penetration thereof so that, for example, if uneven ground is encountered, the depth penetration is corrected and if the density changes of the ground being worked, thus affecting the suction, then once again depth penetration is corrected. Structure is provided to average out the effect of conditions changing the depth of penetration so that the desired average depth of penetration is maintained particularly in relatively wide machines. Switches are actuated by the sensors and these switches are connected to solenoids or solenoid valves which in turn operate the raising and lowering mechanism for the earth working components, the mechanism being operated either by hydraulic rams or reversible electric or hydrostatic motors.

22 Claims, 16 Drawing Figures

DEPTH CONTROL DEVICE FOR GROUND WORKING AGRICULTURAL IMPLEMENTS

BACKGROUND OF THE INVENTION

This invention relates to new and useful improvements in depth control means particularly adapted for use with agricultural implements such as cultivators seed drills and discers and also with underground harvesters such as onion harvesters, sugar beet harvesters, potato harvesters, planters or seeders of the above as well.

It is well known, particularly in seeding opertions, that the subsequent yield will be improved if the seed can be planted as close to the optimum depth as possible.

Under perfect conditions, of course, the seed can be placed the exact amount below the surface of the ground, but in actual practice, many factors affect the depth at which the seed is planted.

For example, uneven ground surface will cause the furrow openers to vary relative to the surface of the ground so that the seed will not be deposited at an even depth. When using relatively wide implements such as discers, the depth is maintained in part by the suction of the discs engaging the earth and if the density of the earth varies, then the suction will vary so that the depth at which the discs are working will also vary.

Furthermore, the seed boxes are usually mounted upon the implement and the weight acting upon the implement therefore varies as the seed quantity in the box varies, once again effecting the depth of penetration of the furrow openers.

Also of importance in controlling the depth of penetration of the furrow opener, is the angle of inclination of the ground. For example, if working in one direction on a side hill, then the depth of penetration will be different than if the machine was working in the opposite direction or upon flat ground.

SUMMARY OF THE INVENTION

It is therefore desirable to provide means whereby the depth of the earth working components is controlled within limits so that the seed may be planted at the desired depth under all conditions and although some adjustments can be made manually, it is difficult for the operator to ascertain whether or not the earth working components are working at a greater or lesser depth than desired, once again particularly with relatively wide agricultural implements which may include several sections connected together in articulated relationship. Under these circumstances, of course, one portion of the implement may be affected by depth varying means whereas the other portions may not.

The present invention overcomes all of the disadvantages inherent with existing earth working machines, particularly seeding devices, by providing sensing means which, in the case of cultivators, controls the relationship between the frame and the ground level and hence the depth of penetration thereof.

Insofar as seeding devices are concerned, and for which the present device is primarily designed, not only are sensing devices provided between the frame and the surface of the ground, but also sensing devices between the gangs carrying the furrow opening devices and the frame of the machine thus providing two variable conditions which may be sensed automatically and continuously. The sensing of these conditions operates the raising and lowering mechanism of the gangs carrying the furrow opening devies so that a pre-set depth of operation may be maintained within limits under all conditions.

The principal object and essence of the invention is therefore to provide a sensing device which is operatively connected to the means for raising and lowering the operating components of the implement so that a pre-set depth of operation is maintained.

Another object of the invention is to provide a device of the character herewithin described which includes sensing devices for the ground contour and sensing devices for the depth of the operating components, both of which are connected together and in turn connected to the means for operating the gangs of the implement.

Yet another object of the invention is to provide a device of the character herewithin described in which a plurality of sensing devices is connected together and averaged so that small surface fluctuations such as furrows and the like do not affect the operation of the invention.

Still another object of the invention is to provide a device of the character herewithin described which is particularly suited for use with disc type seed drills of relatively wide construction and which furthermore includes means for automatically elevating the ground engaging sensing portion when the disc gangs are elevated.

A still further object of the invention is to provide a device of the character herewithin described which is particularly suited for use with existing implements and which can readily be attached hereto.

Still another object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, our invention consists essentially in the arrangement and construction of parts all as hereinafter more particularly described, reference being had to the accompanying drawings in which:-

BRIEF DESCRIPTION OF THE DRAWINGS

FIG. 6 is a schematic side elevation showing one embodiment of the depth control as applied to a seed drill or the like.

In the drawings like characters of reference indicate corresponding parts in the different figures.

DETAILED DESCRIPTION

Before proceeding with the detailed description, it should perhaps be mentioned that the drawings accompanying this application show the invention directed primarily for use with agricultural implements which include furrow opening devices, the depth of which is controlled by applying pressure to the furrow opening devices through springs and the like which react between the gangs carrying the furrow openers and the frame of the machine.

However, it should be appreciated that the invention in part can be utilized with agricultural implements such as cultivators of the duck-foot or other conventional type in which the depth of the earth working components is controlled by raising and lowering the frame relative to the ground engaging wheels.

In the latter instance, the device can control the depth by sensing the relationship of the frame to the ground surface whereas in the former type of implement, not only can the sensing device control the relationship of the frame to the ground, but also can control the pre-set depth of the furrow opening components relative to the ground surface.

Figure 7:
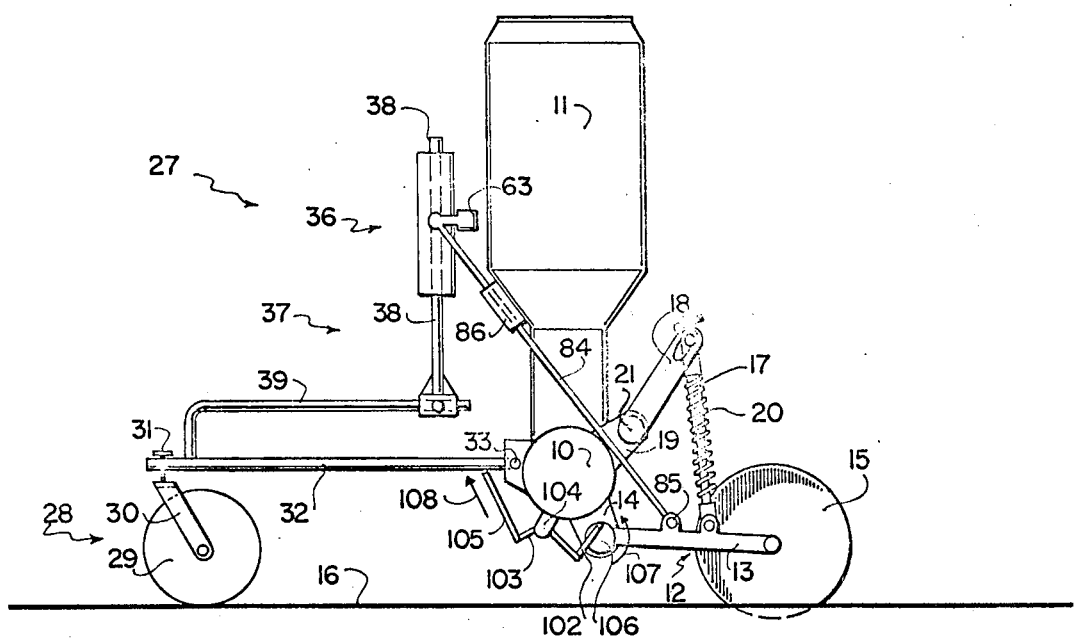
FIG. 7 is a schematic side elevation showing one embodiment of the depth control means as applied to a discer, seeder or the like with the ground engaging support wheels removed for clarity.

Proceeding therefore to describe the invention in detail, rererence should first be made to FIG. 7 which shows an end schematic view of an agricultural implement, in this case, a discer-seeder which includes supporting famework 10 having a seed box 11 mounted thereon and extending the full length of the frame 10.

The frame is supported by land wheels and furrow wheels (not illustrated for clarity) in the conventional manner. A plurality of gangs 12 are pivotally secured to the frame and extending therebehind, each gang including supporting members 13 pivoted to brackets 14 which in turn are secured to the framework 10. A plurality of furrow opening components such as discs 15 are journalled for rotation in side by side relationship between the gang members 13 and the relationship of the gangs to the ground surface 16 is controlled by spring loaded members 17 which extending between the gang frame members 13 and actuating levers 18 which are pivoted to lugs 19 which also extend from the framework 10.

The members 17 are in the form of rods extending through clevises (not illustrated) in the upper ends of the members 18 and heavy duty springs 20 react between the clevis and the members 13, and transfer pressure from the actuators 18 to the disc gangs 12. The actuators 18 are mounted on an elongated shaft 21 which is connected to either hydraulic rams or electrically operated rams in order to apply the necessary pressure to the actuators 18. All of the foregoing structure is conventional and it is therefore not believed necessary to describe same further.

Figure 6:
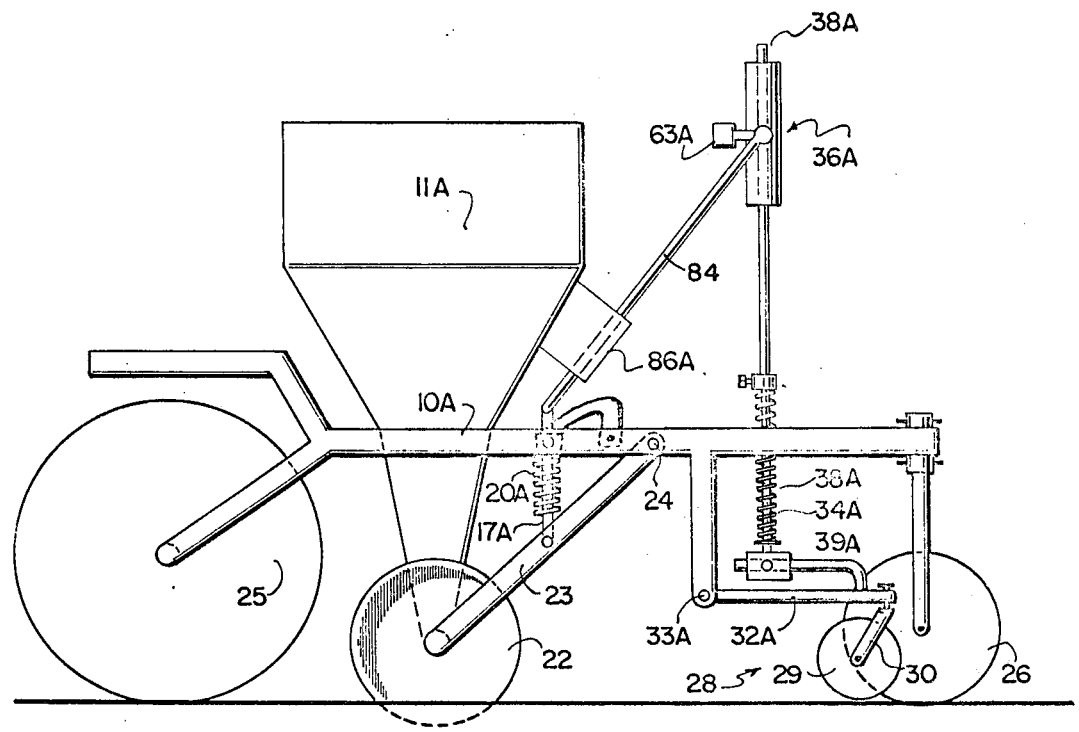

FIG. 6 shows the invention as applied to a different type of agricultural implement, in this case a hoe drill or drill press. Reference 10A illustrates supporting framework with the seed box 11A supported thereon.

The furrow openers in this instance comprise discs 22 jourrnalled for rotation between members 23 which in turn are pivotally secured to the supporting framework 10A as indicated by reference character 24. Alternatively, furrow openers in the form of hoes or shovels can be used.

Packing wheels 25 are journalled for rotation on the rear of the framework 10 and the furrow openers 22 are controlled by spring pressure devices 17A similar to those hereinbefore described. Front wheels 26 are also supported on the front of the framework 10A and, these together with the packer wheels 25, support the implement for movement over the ground with the depth of the furrow openers being controlled by hydraulic rams or electric rams (not illustrated) as hereinbefore described.

Reverting back to FIG. 7 the invention is collectively designated 27 and includes a surface engaging sensing device collectively designated 28 which, in this embodiment, comprises at least one wheel 29 journalled for rotation within a fork 30 which in turn is supported for castoring action as by support 31, adjacent the front end of a wheel carrying bar 32. This bar is pivoted by the rear end thereof to the supporting framework 10 as indicated by reference character 33.

However, although wheels 29 are shown in the drawings, nevertheless it will be appreciated that skids or skis can be provided, if desired, instead of the wheels 29.

Although one surface engaging sensing member 28 can be used, nevertheless it is desirable that at least two members be used in spaced apart relationship in order to give a greater degree of control to the operation of the device.

A switch assembly collectively designated 36 is provided and this switchh assembly is operated by an actuator assembly collectively designated 37. This includes an operating member 38 connected by one end thereof to the wheel arm 32 and by the other end thereof to the switch assembly 36 as will hereinafter be described. In FIG. 7, the connection of the operating member 38 is by means of a horizontal bar 39 extending from the wheel arm 32 and running substantially parallel thereto. However, other constructions can be used as will hereinafter be described.

Before proceeding further with the description of the device, reference should be made to FIGS. 1 to 5.

Figure 1:
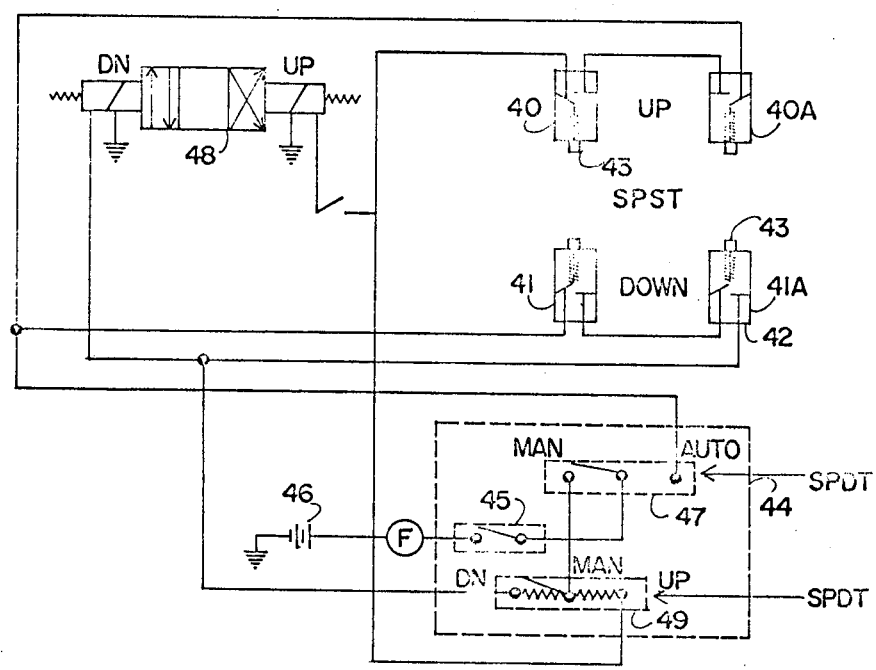
FIG. 1 is a schematic circuit diagram of one embodiment showing the use of mechanical switches and hydraulic solenoid valves for the raising and lowering means.

Dealing first with FIG. 1, this shows a schematic circuit diagram of the operating portion of the device.

The switch assembly, in this particular embodiment, includes mechanical switches 40 and 40A constituting the "up" switches and mechanical switches 41 and 41A constituting the "down" operating switches.

These switches are contained within boxes 42 and include spring loaded plungers 43 extending therefrom and the plungers and spring loaded so that normally, the switches are in the "off" position.

A main control box collectively designated 44 is provided, preferably in the cab of the tractor, and includes a main switch 45 connecting the battery 46 to the device.

A single pole double throw switch 47 is situated within the control box and when in one position, permits the device to be used manually and when in the other position, permits the device to be used automatically.

The switches 40, 40A, 41 and 41A are operatively connected to a solenoid valve shown schematically by reference character 48 and this solenoid valve is connected in the conventional manner to the devices which operate the furrow opening gangs 12. As this arrangement is conventional, it is not believed necessary to describe same further.

When the switch 47 is in the manual position, the operator is able to control or pre-set the depth of the furrow openers by the manual switch 49 also situated in the control box. This is preferably a single pole double throw switch with a spring returned centre and when moved in one direction, completes the circuit to switches 41 and 41A thus operating the solenoid valve in the "down" position. When moved in the opposite direction, the switch completes the circuit to the switches 40 and 40A and thus actuates the solenoid valve in the up position.

In FIG. 1, it will be noted that there are two "up" switches 40 and 40A and two down switches 41 and 41A and that these switches are wired in series. This means that at least two surface engaging sensing members are provided and that the circuit is not completed unless both of the up switches or both of the down switches are actuated. This averages out any movement of the disc gangs and prevents the disc gangs from being actuated by relatively small surface deflections met by the wheels 29.

Figure 2:
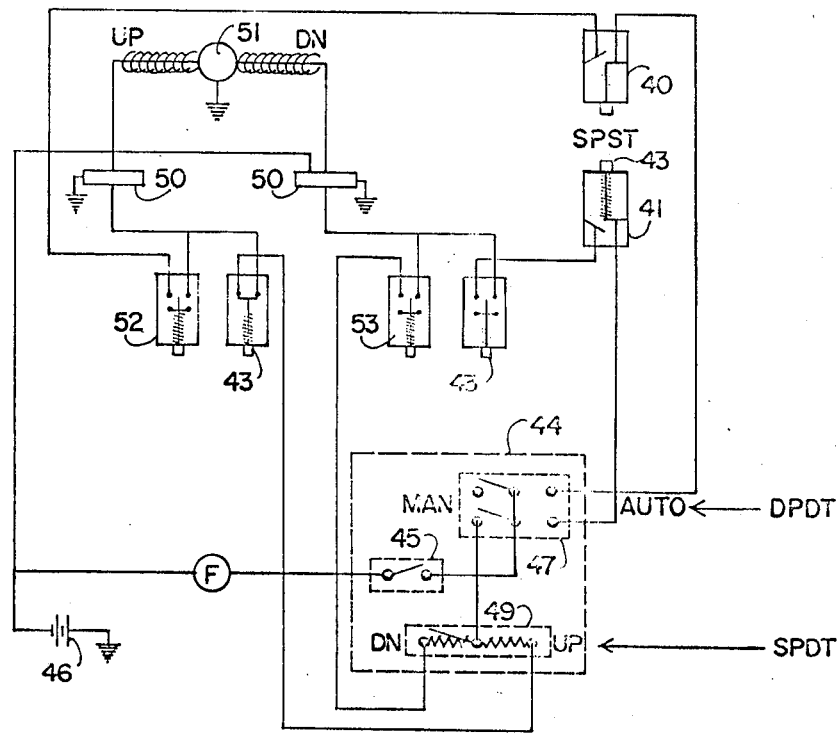
FIG. 2 is a schematic circuit diagram of one embodiment showing the use of mechanical switches and electrical raising and lowering means.

FIG. 2 shows a schematic circuit diagram for use with electric lift devices for raising and lowering the gangs and mechanical switches.

Once again the control box 44 includes the switches 45, 47 and 49.

In this embodiment, it will be noted that there is one up switch 40 and one down switch 41 operatively connected to solenoids 50 which in turn are connected to a reversible electrical motor 51 with an internal automatic brake operated by battery 46. In this particular embodiment, four safety switches are provided, an up pair 52 and a down pair 53. These are normally "on" switches and are adapted to be operated when the gangs are at the upper or lower limits of their movement, a safety feature which is necessary when an electric lift is being used.

Figure 3:
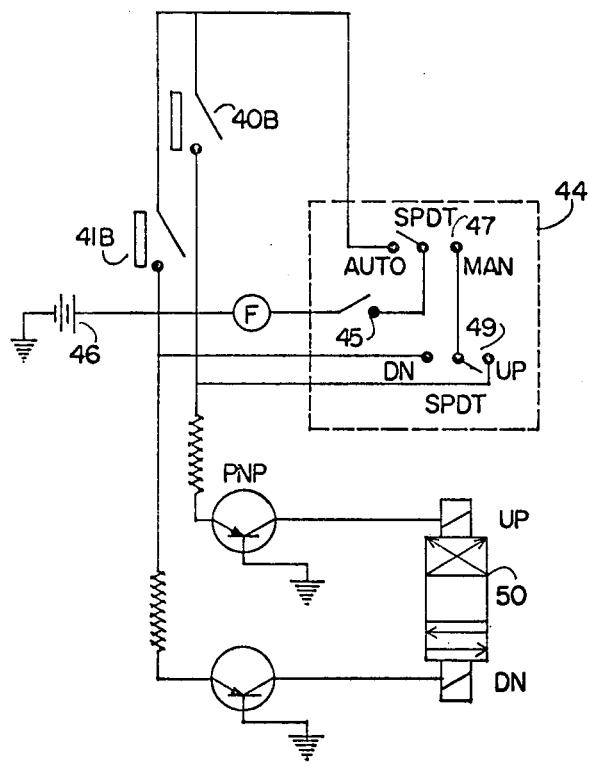
FIG. 3 is a schematic circuit diagram using electrical switches and a transistorized circuit.

FIG. 3 shows an electrical circuit diagram illustrating an alternative method of operating the solenoid valves 50. In this connection, magnetic reed switches 40B and 41B are provided in the switch assembly and are connected as shown. These reed switches turn on the emitter base circuit of the transistors thus causing current to also flow in the base collector circuits thereby tripping the solenoid valve assembly 50. Use of the transistors with the two load resistors illustrated, provides means whereby a high current load can be switched on and off with very little bias current.

Once again the system can be manually operated or operated automatically as hereinbefore described.

Figure 4:
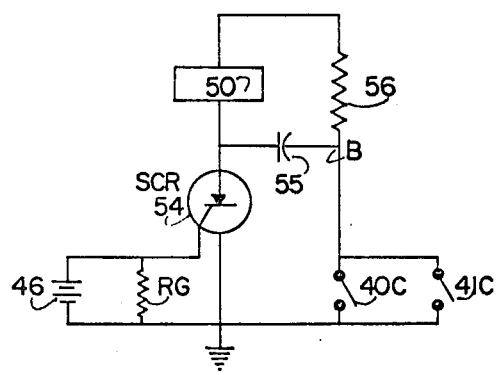
FIG. 4 is a schematic circuit diagram using electrical switches and a silicone controlled rectifier.

FIG. 4 shows a circuit where a silicon controlled rectifier transistor 54 is utilized including a shunt capacitor turn-off system. The SCR is off until a triggering signal is applied to the input in order to turn it on. When the SCR is conducting, the capacitor 55 charges through the series resistor 56 until point "B" reaches the full positive supply voltage.

In a silicon controlled rectifier, even after the triggering signal is removed, power flows to the load 50. When switch 40C or 41C is closed, point B is at ground potential and the charge on the capacitor discharges into the load thereby reducing the current to 0. With no holding current in the SCR, it ceases to conduct.

Once again the SCR circuit can also use a very low current to turn on a very large current so that small sealed reed switches can be used instead of the mechanical switches hereinbefore described.

Figure 5:
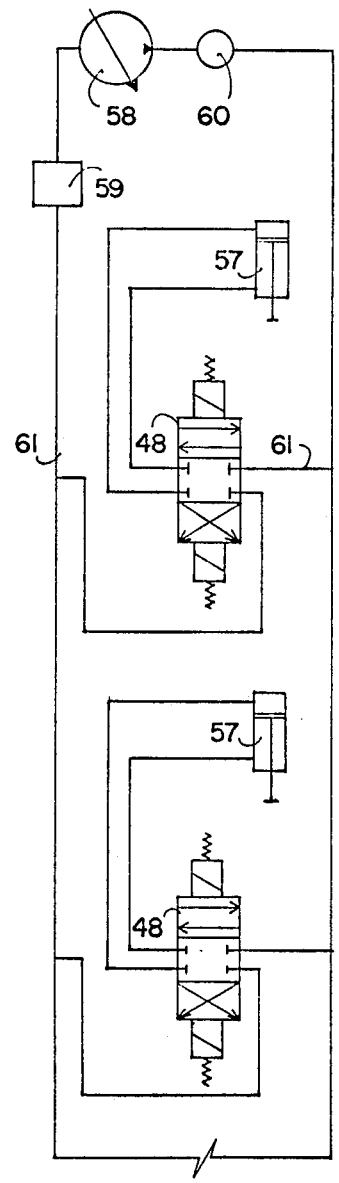
FIG. 5 is a schematic circuit diagram showing the hydraulic circuit for the raising and lowering means.

FIG. 5 shows the hydraulic circuit operated by the solenoid valve 48, it being understood that one or more solenoid valves can be provided operatively connected to the hydraulic rams 57 which in turn are connected to the gangs carrying the furrow openers so that gangs can be raised or lowered relative to the supporting frame.

Hydraulic pump 58 is connected to tank 59 and pumps oil through filter 60 to the solenoid valve or valves 48 and then returns to tank 59 with the conventional conduits being illustrated by reference character 61.

The solenoid valves direct the oil under pressure to either side of the pistons of the rams 57 thus causing the rams to operate and it will be noted that these can be operated independently of one another depending upon the demand of the depth control device as will hereinafter be described.

Two types of switch assembly 36 are shown in the drawings, but of course it will be appreciated that the invention is not limited to the use of only these particular types of actuation.

Figure 8:
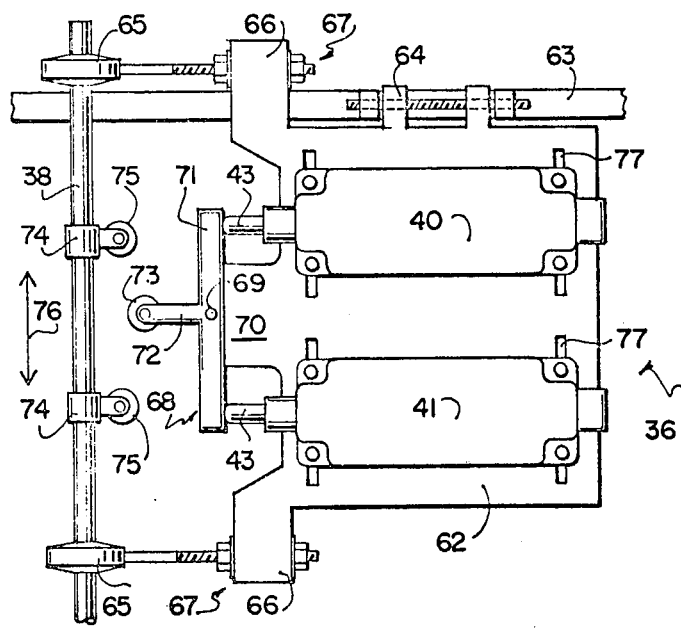
FIG. 8 is a fragmentary front elevational view of one embodiment of the switch assembly.

Dealing first with the embodiment shown in FIG. 8, switches 40 and 41 are mounted on a flat plate 62 which in turn is supported from a transverse bar 63 by means of the hinge connection 64. Details of the connecting bar 63 will hereinafter be described.

The operating member 38 extends upwardly from the wheel carrying bar 32 as hereinbefore described and is journalled within upper and lower sliding bearings 65 which in turn are supported by brackets 66 secured to the upper and lower sides of the flat plate 62 and these sliding supports are adjustable relative to the brackets by means of the bolt and nut assemblies collectively designated 67 and which are conventional.

The switches 40 and 41 are situated transversely of the plate 62 with the plungers 43 extending outwardly upon one side thereof as clearly shown in FIG. 8.

A rocker arm component 68 is pivoted intermediate the ends thereof by pivot 69, upon a bracket 70 extending from one side of the plate 62 and this rocker arm includes a vertically situated lever arm 71 which engages the plungers 43 as shown.

A central portion 72 extends outwardly from adjacent the pivot 69 and is provided with a roller 73 journalled within the end thereof.

Upper and lower contactors 74 are adjustably secured to the operating member 38 and these in turn are provided with rollers 75 journalled thereto and adapted to strike roller 73 when the operating member moves vertically in the direction of double-headed arrow 76 due to pivotal movement of the wheel support arm 32.

The engagement of either the rollers 75 with roller 73 will, of course, rock the arm 71 around pivot 69 and operate one or the other of the switches 40 and 41 thus raising and lowering the gangs 12 through the rams 57 or the electric motor 51. It will be noted that the switches 40 and 41 are adjustably mounted within slots 77 formed in the plate 62.

The connecting bar 63 is used if there are two or more surface engaging sensing members 28 in spaced apart relationship. Under these circumstances, the switch units are connected by the connecting bar 63 in order to average out the movement or operation of the switch units and to transfer the vertical movement of one operating member 38 to the other if the movement is of a major nature. With the switches in series as hereinbefore described, the vertical movement of both operating members would be required in order to operate the rams.

The disc gangs can be pre-set insofar as depth is controlled by the manual operation of switch 49.

Figure 9:
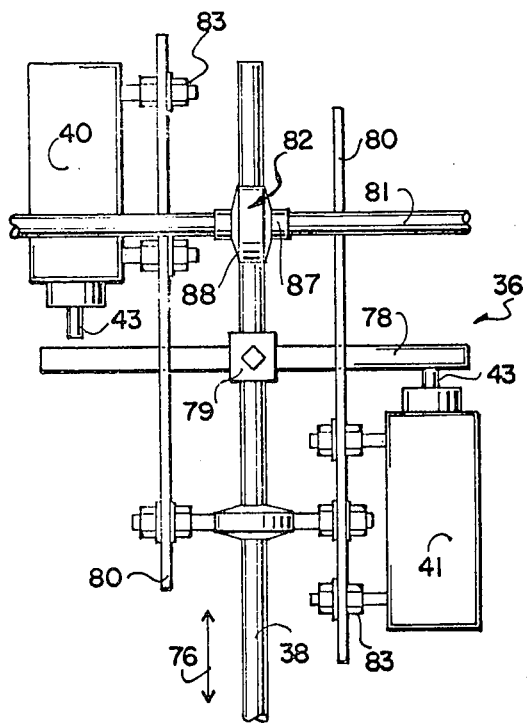
FIG. 9 is a fragmentary front elevational view of another embodiment of the switch assembly.

The preferred embodiment of the switch assembly is shown in FIG. 9 and in certain of the other views.

Reference character 38 illustrates the operating member hereinbefore described with an actuator bar 78 being clamped thereto and extending upon either side thereof in a horizontal plane, the clamp 79 being movable vertically upon the operating member 38.

Slotted plates 80 are secured to a connector or support bar 81 which will hereinafter be described, by means of the compound bracket 82 an the switches 40 and 41 are mounted for vertical adjustment within these slotted brackets 80 by means of bolt and nut assemblies 83 with the plungers 43 extending downwardly and upwardly respectively and being engaged by the ends of the cross bar 78 so that vertical movement of the operating member 38 in the direction of double-headed arrow 76 will operate one or other of the switches 40 or 41 and the arrangement can be adjusted for the sensitivity of reading depending upon the circumstances.

Once again, pairs of switches 40 and 41 can be connected in series and mounted in spaced apart relationship upon the support bar 81 or, alternatively, a single switch assembly can be used.

With either of the switch assemblies shown in FIGS. 8 and 9, connections are made to the furrow opening gangs 12 and reference to FIG. 7 will show the schematic connection which comprises a bar or rod 84 pivoted by the lower end thereof to a lug 85 extending from the gang frame member 13. It extends upwardly through a guide or sheave 86 and may be connection to the connecting member 63 or 81 so that movement of the gangs will also move 63 or 81 and thus operate the switch assemblies so that there is an interconnection between the gang adjustment and the sensing member 28.

In other words, the pre-set depth of the furrow openers or discs 15 is maintained both with regard to uneven surface contours due to the surface engaging sensing members 28 and due to any change in depth which may be due to different soil conditions. For example, if the machine or implement strikes an area of relatively hard ground, then the discs tend to move upwardly so that correct tillage is not undertaken insofar as weeds are concerned and the seed is not deposited at the right depth. By contrast, if an area of soft ground is encountered, the discs or furrow openers tend to move deeper into the soil, once again depositing the seed at the wrong level so that germination is affected.

By providing an interconnection between the surface engaging sensing members 28 and the pre-set position of the gans or furrow openers 12, the pre-set depth of the furrow openers can be maintained within limits.

Figure 10:
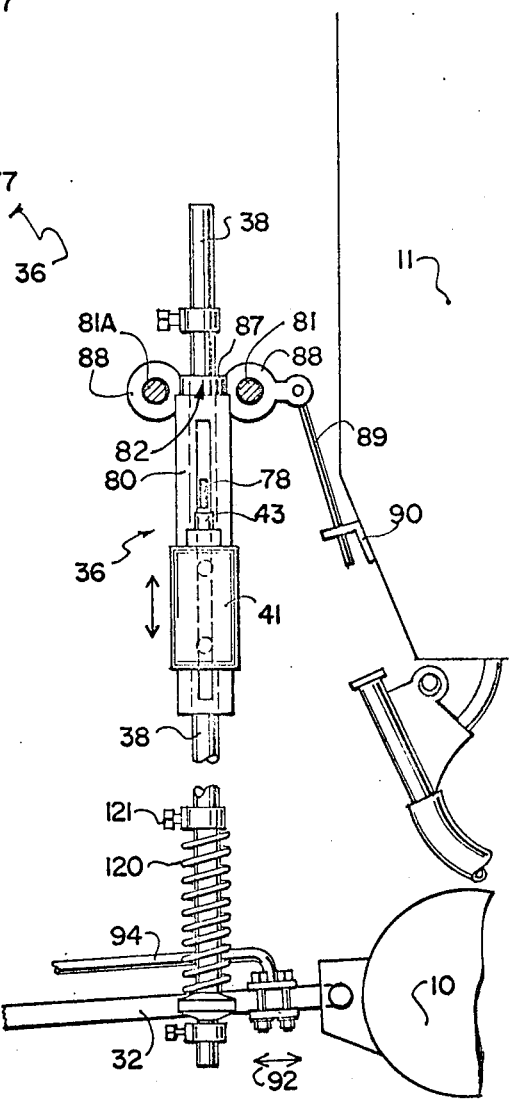
FIG. 10 is a viiew similar to FIG. 9, but taken at right angles thereto.
Figure 10A:
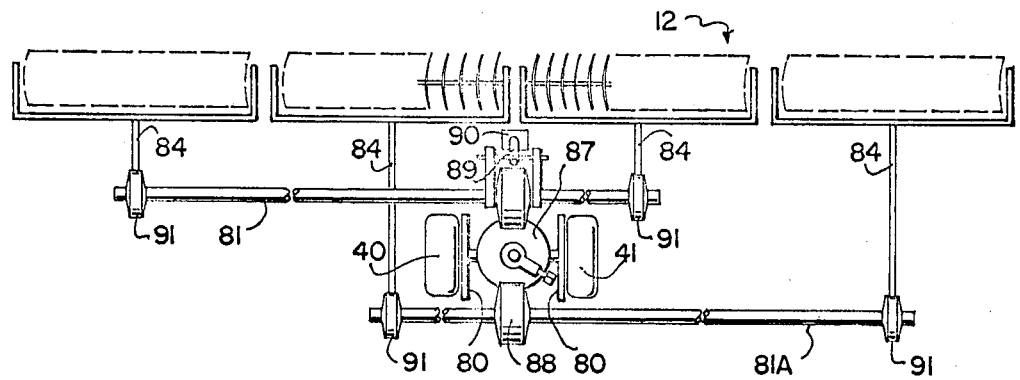
FIG. 10A is a schematic plan view of one embodiment incorporating the switch assemblies of FIGS. 9 and 10.

It is preferable that the gangs be interconnected in order to average out any variation of depth which may be encountered and in this connection, reference should be made to FIGS. 10 and 10A.

The compound support 82 includes a horizontally situated sliding bearing 87 with two vertically situated sliding bearings 88 secured as by welding one to each side of the horizontal bearing 87. The operating member 38 extends through the horizontal bearing 87 and a pair of connecting members 81 and 81A extend through the vertical sliding members 88. A support rod 89 is pivoted by the upper end thereof to one side of the rearmost sliding bearing 88 and slides within a bracket 90 extending from the front of the seed box 11 and stabilizes the switch assembly 36.

Rods 84 extending from the individual gangs (see FIG. 10A) are connected alternatively to the members 81 81A by means of sliding bearings 91 so that the movement of the gangs 12 is averaged out insofar as their action upon the switch assembly 36 is concerned, it being understood that a single switch assembly is being utilized in this particular embodiment.

It should also be noted that the mounting of the operating member 38 to the wheel support bar 32 is adjustable in the direction of double-headed arrow 92 (see FIG. 10) once again controlling the sensitivity of the motion of the wheel 29 relative to the switch assembly 36.

Figure 12:
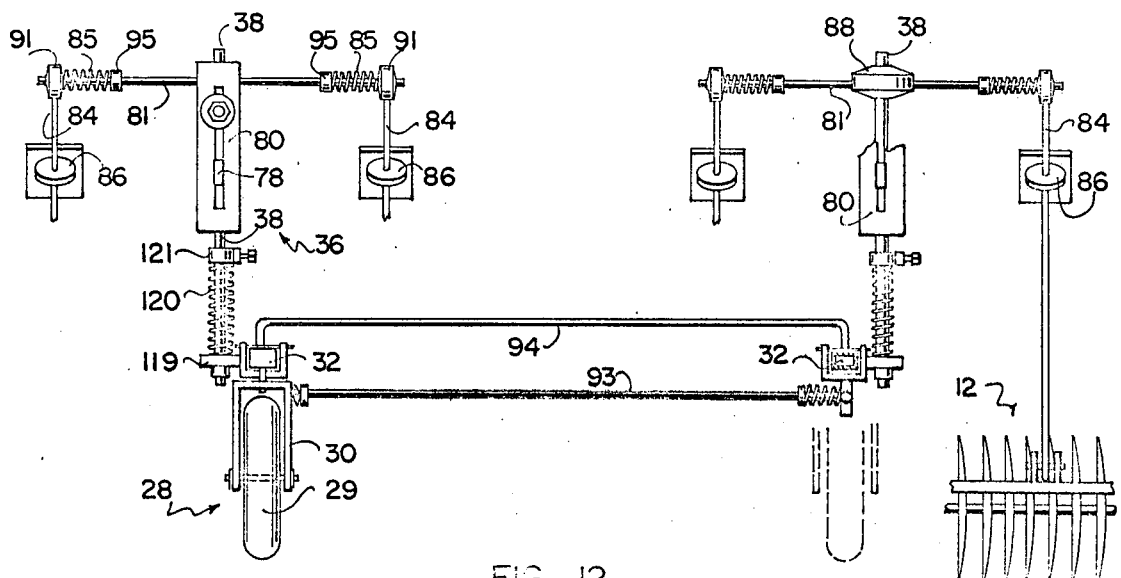
FIG. 12 is a fragmentary front view of another embodiment using a pair of switch assemblies in series with the switch boxes removed for clarity.

FIG. 12 shows an embodiment in which at least two surface engaging sensing members 28 are utilized in spaced apart relationship.

A tie rod 93 extends between the wheel forks 30 and is in the form of a steering rod so that the wheels are maintained parallel to one another and do not chatter or wander due to movement over an uneven surface.

The vertical movement of the wheels 29 relative to the surface 16 is averaged out by means of a torsion bar 94 secured by each end thereof to each of the wheel support bars 32 so that vertical movement of one of the support bars is transferred in part to the other wheel support bar 32.

In FIG. 12, a pair of switch assemblies 36 is provided, one for each sensing member 28 and a connecting member 81 supports the switch assembly 36 with rods 84 extending from pairs of gangs upwardly to the connecting member 81. In this regard, springs 85 centre the rod 81 relative to the rods 84 reacting between the sliding bearings 91 and collars 95 secured to the connecting rod 81. In the embodiment shown in FIG. 12, the switch assemblies are in series as described with reference to FIG. 1.

Figure 11:
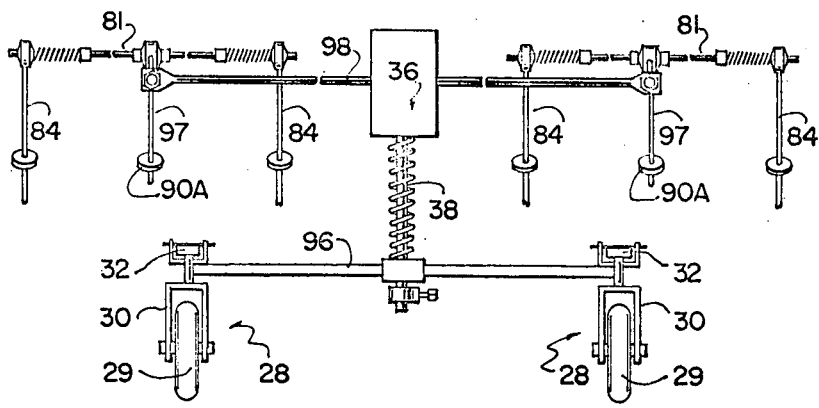
FIG. 11 is a fragmentary front view of one embodiment using a single switch assembly with switch boxes removed for clarily.

FIG. 11 shows the preferred embodiment which includes a pair of ground engaging sensing members 28 similar to those hereinbefore described with reference to FIG. 12, but having a connecting rod 96 extending between the wheel supports bars 32.

A single switch assembly 36 is provided operated by an operating member 38 extending upwardly from intermediate the ends of the connecting bar 96.

Connecting members 81 connect two pairs of disc gangs by means of rods 84 as hereinbefore described and these connecting members 81 are in turn supported by a guide rod 97 secured centrally of the connecting members 81 and engaging within a sliding bearing or support 90A similar to that illustrated in FIG. 10.

A main connecting member 98 is secured by the ends thereof to the points of attachment of the guide rods 97 to the members 81 and the switch assembly 36 is connected to this main connecting member 98 centrally thereof thus averaging out not only the movement of the sensing members 28, but also of all of the gangs connected by rods 84 to the averaging or connecting members 81.

Figure 13:
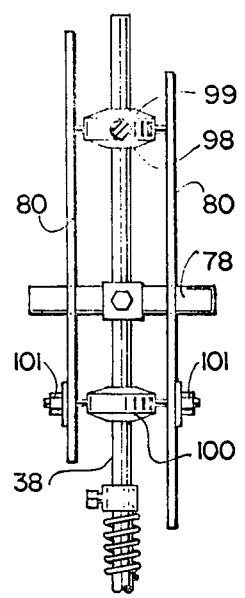
FIG. 13 is a fragmentary side elevational view of one switch assembly of FIG. 12.

In this embodiment, the switch assembly is mounted in a manner similar to that shown in FIG. 13 with the plates 80 being at right angles to the position shown in FIG. 9. These plates are secured to a horizontal sheave or bearing 99 with the main connecting member 98 extending outwardly on either side thereof.

The plates are further supported upon a horizontal sheave or sliding bearing 100 adjacent the lower ends of the plates, by means of nuts 101 and the member 38 slides within these bearings 100 and 99 thus supporting the operating member in a manner similar to bearings 65 hereinbefore described.

In FIG. 13, the switches have been removed from the supporting plates 80, for clarity, but the actuator bar 78 is shown.

It is desirable that when the furrow openers or gangs 12 are lifted clear of the soil for transport purposes, that the sensing members 28 are also lifted clear of the ground.

FIG. 7 shows one method of interconnecting the two and includes a rod 102 secured to the shaft operating the gangs and being rotatable thereby. This rod is connected to a crank arm 103 pivoted on bracket 104 and a lift rod 105 is connected to the other end of the crank arm.

When the shaft 106, supporting the gangs, moves in the direction of arrow 107, the linkage causes the rod 105 to move in the direction of arrow 108 and engage under the wheel support arms 32 thus lifting same clear of the ground.

Figure 14:
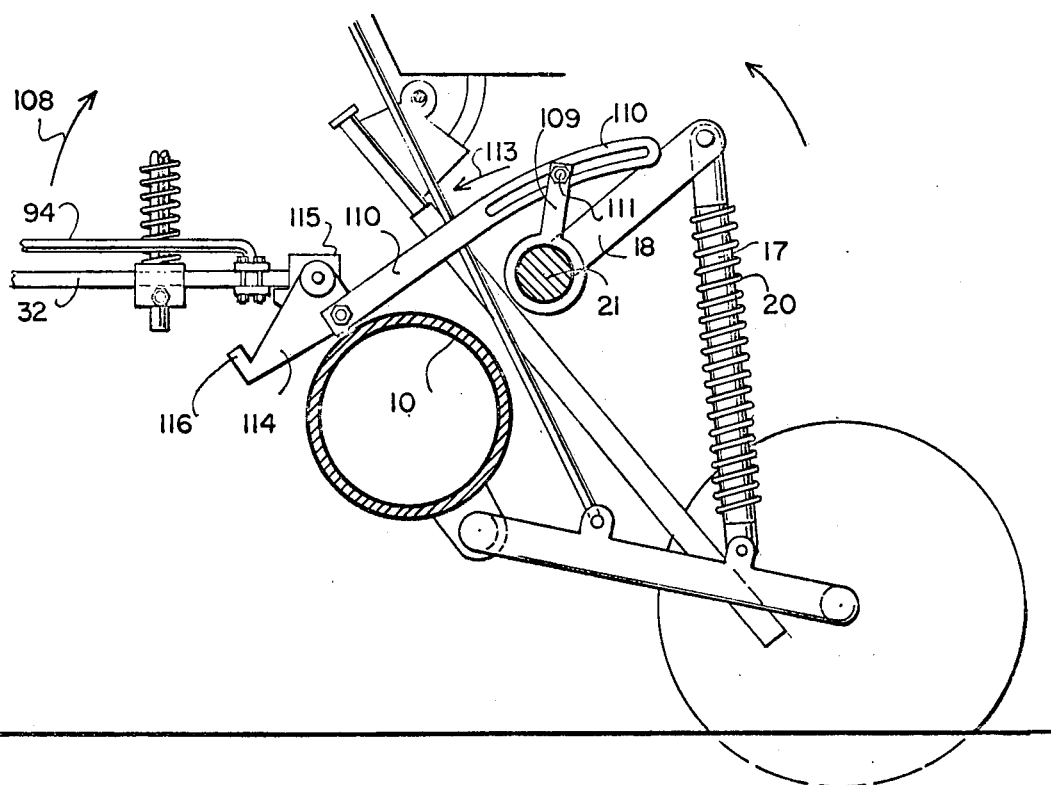
FIG. 14 is a fragmentary side elevation of one embodiment of the ground surface sensing unit lifting device.

The preferred method of interconnecting the two is shown in FIG. 14 which includes an arm 109 extending upwardly from the shaft 106 and being rotatable thereby.

A slotted link 110 is connected to the upper end of this arm and normal operation of the shaft 106 causes the pin connection 111 to ride freely in the slot.

However, when the gangs are lifted clear of the ground then the pin 111 engages the end of the slot 112 thus moving the arm in the direction of arrow 113. This link 110 is connected to a crank 114 pivoted upon a bracket 115 extending from the supporting framework and a plate 116 on the opposite end of the crank arm or plate engages under the wheel support arm 32 thus lifting it upwardly in the direction of arrow 108 when the disc gangs are lifted upwardly to their fullest extent.

Figure 15:
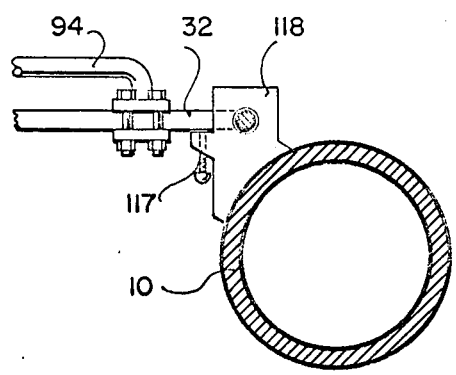
FIG. 15 is a fragmentary enlarged side elevation of the sensing unit pivot showing the adjustable stop limiting the downward movement thereof.

FIG. 15 shows an adjustable stop 117 extending from the support lugs 118 to which the wheel arm 32 is pivoted, limiting the downward movement of the wheel arms and hence the wheels 29. This prevents them dropping into a hole or crevice when in use.

In the event that a rock or other obstruction is engaged by the wheels 29, means are provided to prevent undue or rapid upward movement thereof and this is best illustrated in FIG. 12. The lower end of the actuating or operating member 38 engages through an apertured bracket 119 secured to the wheel support arms 32 and a compression spring 120 extends around this lower end and reacts between a collar 121 secured to the member 38 and the bracket 119. When the wheel raises and lowers normally, the stiffness of the spring 120 moves member 38 vertically, but if a sudden vertical movement is encountered due to the wheel striking a rock or the like, then the spring comprises allowing the member 38 to slide in bracket 119 and preventing sudden or excessive vertical movement from occurring.

It will be appreciated from the foregoing, that a single sensing component 28 can be used or a plurality of sensing components. If a plurality of sensing components is incorporated, then these can be averaged out by interconnecting same.

Furthermore, the various gangs can be interconnected one with the other so that the movement thereof is averaged out and these in turn can be operatively connected to the sensing members 28.

Either single or double switch assemblies can be utilized and if double switch assemblies are used, then these can be connected in series so that once again averaging is accomplished.

This device enables the depth to be pre-set on any tillage or seeding machine and enables this pre-set depth to be maintained within limits thus increasing the yield in crop due to the proper depth of seed placement.

On any spring tension tilling machine, the depth varies not only due to surface contours, but also due to soil changes. When the ground encountered is relatively hard, the tillage gangs lift out and leave weeds on untilled ground. When soft ground is encountered, the tillage gangs tend to go too deep and place seed so that it dies and cannot germinate. Furthermore, the weight of the machine changes, filled with fertilizer and/or seed, as this fertilizer or seed is used.

The use of the present invention overcomes these disadvantages due to the fact that the change of soil is sensed by the movement of the disc gangs thereby operating the rams or electrical jacks to exert more or less pressure on the spring loaded tillage gangs.

Although the control box 44 illustrated in FIGS. 1 and 2 is adapted normally to be situated within the cab of the towing vehicle such as a tractor, nevertheless it will be appreciated that the various components can be radio controlled from the cab rather than have the various conduits and wires extending physically between the cab and the implement.

However, as such radio controlled devices are well known, it is not believed necessary to describe same further.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention:

1. A depth control device for earth working agricultural implements such as cultivators, seed drills, discers, underground harvesters and planters and the like which includes supporting framework, ground engaging wheels supporting said framework, earth working components supported from said supporting framework and means to raise and lower and hence adjust the depth of penetration of said earth working components in the ground being worked; said device comprising in combination at least two surface engaging sensing members spaced apart from one another and each operatively secured by one end thereof to said framework and extending in advance of said earth working components, means operatively connected between said surface engaging sensing members to average out the vertical movement required to operate said means to adjust said depth of penetration, said means operatively connected between said surface engaging sensing members including a connecting bar secured by one end thereof to one of said surface engaging sensing members and by the other end thereof to the other of said surface engaging sensing members, and means operatively connected between said connecting bar and said means to adjust the depth of penetration of said earth working components to operate said last mentioned means thereby maintaining said earth working components at a predetermined depth of penetration relative to the surface of the ground.

2. The device according to claim 1 in which said means operatively connected between said surface-engaging sensing members and said means to adjust the depth of penetration of said earth working components, includes at least one switch assembly operatively connected to said means to adjust the depth of penetration of said earth working components, said switch assembly including a first switch for increasing the depth of penetration and a second switch for decreasing the depth of penetration, and an actuator assembly extending from said surface engaging sensing members for operating said first and second switches responsive to movement of said surface engaging sensing members.

3. The device according to claim 2 in which said actuator assembly includes an operating member secured to said surface engaging sensing members and extending therefrom, said first and second switches being mounted one above the other and including extending spring loaded, normally off, operating plungers extending from one side thereof, a rocker arm pivoted intermediate the ends thereof adjacent said plungers with said ends of said rocker arm in operative contact with said plungers, a lever arm extending from said rocker arm intermediate the ends thereof, upper and lower contactors adjustably secured to said operating member adapted to contact said lever arm and hence operate one or the other of said switches responsive to vertical movement of said surface engaging sensing members.

4. The device according to claim 3 which includes a roller journalled for rotation on the distal end of said lever arm and a roller journalled for rotation on the distal end of each of said contactors.

5. The device according to claim 2 in which said actuator assembly includes an operating member secured to said connecting bar and extending therefrom, said first and second switches being mounted one above and one below a common plane and having spring loaded, normally off plungers extending downwardly and upwardly therefrom respectively, and an operating arm adjustably secured transversely to said operating member and adapted to contact said plungers and hence operate one or the other of said switches responsive to vertical movement of said surface engaging sensing members.

6. The device according to claim 1 in which said earth working components are moveable from an earth working position to a transport position, and means operatively connected between said earth working components and said surface engaging sensing members to elevate said surface engaging sensing members clear of the ground when said earth working components are in the transport position, said last mentioned means including a crank arm pivoted to said supporting framework, a surface engaging sensing member engaging arm extending from one side of said crank arm, and loose linkage means extending from one of said earth working components and the other side of said crank arm whereby movement of said earth working components clear of the ground takes up said loose linkage means and rotates said crank arm thereby elevating said surface engaging sensing members.

7. The device according to claim 6 in which said earth working components include gangs, a sensing rod for each gang secured by one end thereof to each of said gangs for longitudinal movement corresponding to movement of said gangs, a connecting member operatively connected by the ends thereof to adjacent pairs of gangs, guide means intermediate the ends of each of said connecting members and mounted to said supporting framework for supporting each said connecting member for movement by said gangs and a further connecting member secured by the end thereof to each of said guide means, said further connecting member and said connecting members averaging out the movement of said gangs required to operate said means to raise and lower said gangs, said further connecting member being secured intermediate the ends thereof to said means operatively connected between said surface engaging sensing member and said means to raise and lower said gangs.

8. A depth control device for earth working agricultural implements such as seed drills, discers, underground harvesters, planters and the like and which includes supporting framework, ground engaging wheels supporting said framework, said implements including a plurality of spring loaded gangs of furrow opening components mounted in said framework and means to raise and lower said gangs relative to the supporting framework, to set the depth of penetration of said components within the ground; said device comprising in combination at least one surface engaging sensing member pivoted by one end thereof to said framework and extending in advance of said components, means operatively connected between said surface engaging sensing member and said means to raise and lower said gangs, to operate said last mentioned means thereby maintaining said gangs at a predetermined depth of penetration relative to the surface of the ground, and further means operatively connected between said gangs and said means operatively connected between said surface engaging sensing member and said means to raise and lower said gangs, also to operate said last mentioned means thereby maintaining said gangs in a predetermined depth of penetration relative to the surface of the ground, said further means including a sensing rod for each of at least two of said gangs and means operatively connecting said sensing rods with said means operatively connected between said surface engaging sensing member and said means to raise and lower said gangs, to average out the movement of said gangs required to operate said last mentioned means, said means operatively connected between said surface engaging sensing member and said means to raise and lower said gangs to set the depth of penetration of said component, including at least one switch assembly operatively connected to said means to raise and lower said gangs, said switch assembly including a first switch for increasing the depth of penetration and a second switch for decreasing the depth of penetration and an actuator assembly extending from said surface engaging sensing member for operating said first and second switches responsive to movement of said surface engaging sensing member, said means to average out the movement of said gangs required to operate said last mentioned means including a connecting member secured by the ends thereof to said sensing rods, said switch assembly being mounted to said connecting member intermediate the ends thereof.

9. The device according to claim 8 in which said at least one surface engaging surface member includes at least two surface engaging sensing members extending from said supporting framework and spaced apart from one another, and means operatively connected between said surface engaging sensing members to average out the vertical movement which is required to operate said switch assembly, said last mentioned means including a connecting bar secured by one end thereof to one of said surface engaging sensing members and by the other end thereof to the other of said surface engaging sensing members, said actuator assembly being operatively connected to said connecting bar.

10. The device according to claim 9 in which said gangs are movable from a furrow opening position to a transport position, and means operatively connected between said gangs and said surface engaging sensing members to elevate said surface engaging sensing members clear of the ground when said gangs are in the transport position, said last mentioned means including a crank arm pivoted to said supporting framework, a surface engaging sensing member engaging arm extending from one side of said crank arm, and loose linkage means extending between one of said gangs and the other side of said crank arm whereby movement of said gang clear of the ground takes up said loose linkage means and rotates said crank arm thereby elevating said surface engaging sensing members.

11. The device according to claim 10 which includes a second connecting member operatively connected by the ends thereof to adjacent pairs of gangs, guide means intermediate the ends of said second connecting member and mounted to said supporting framework for supporting said second connecting member for movement by said gangs and a further connecting member secured by the end thereof to each of said guide means, said further second connecting member and said connecting member averaging out the movement of said gangs required to operate said means to raise and lower said gangs, said further connecting member being secured intermediate the ends thereof to said means operatively connected between said surface engaging sensing member and said means to raise and lower said gangs.

12. The device according to Claim 9 which includes a second connecting member operatively connected by the ends thereof to adjacent pairs of gangs, guide means intermediate the ends of said second connecting member and mounted to said supporting framework for supporting said second connecting member for movement by said gangs and a further connecting member secured by the end thereof to each of said guide means, said further connecting member and said second connecting member averaging out the movement of said gangs required to operate said means to raise and lower said gangs, said further connecting member being secured intermediate the ends thereof to said means operatively connected between said surface engaging sensing member and said means to raise and lower said gangs.

13. The device according to claim 8 in which said actuator assembly includes an operating member secured to said surface engaging sensing member and extending therefrom, said first and second switches being mounted one above the other and including extending spring loaded, normally off, operating plungers extending from one side thereof, a rocker arm pivoted intermediate the ends thereof adjacent said plungers with said ends of said rocker arm in operative contact with said plungers, a lever arm extending from said rocker arm intermediate the ends thereof, upper and lower contactors adjustably secured to said operating member adapted to contact said lever arm and hence operate one or the other of said switches responsive to vertical movement of said surface engaging sensing member.

14. The device according to claim 8 in which said actuator assembly includes an operating member secured to said surface engaging sensing members and extending therefrom, said first and second switches being mounted one above and one below a common plane and having spring loaded, normally off plungers extending downwardly and upwardly therefrom respectively, and an operating arm adjustably secured transversely to said operating member and adapted to contact said plungers and hence operate one or the other of said switches responsive to vertical movement of said surface-engaging sensing member.

15. The device according to claim 8 in which said actuator assembly includes an operating member secured to said surface engaging sensing member and extending therefrom, said first and second switches being mounted one above the other and including extending spring loaded, normally off, operating plungers extending from one side thereof, a rocker arm pivoted intermediate the ends thereof adjacent said plungers with said ends of said rocker arm in operative contact with said plungers, a lever arm extending from said rocker arm intermediate the ends thereof, upper and lower contactors adjustably secured to said operating member adapted to contact said lever arm and hence operate one or the other of said switches responsive to vertical movement of said surface engaging sensing member.

16. The device according to claim 8 in which said gangs are movable from a furrow opening position to a transport position, and means operatively connected between said gangs and said surface engaging sensing member to elevate said surface engaging sensing member clear of the ground when said gangs are in the transport position, said last mentioned means including a crank arm pivoted to said supporting framework, a surface engaging sensing member engaging arm extending from one side of said crank arm, and loose linkage means extending between one of said gangs and the other side of said crank arm whereby movement of said gang clear of the ground takes up said loose linkage means and rotates said crank arm thereby elevating said surface engaging sensing member.

17. The device according to claim 8 which includes guide means intermediate the ends of said connecting member and mounted to said supporting framework for supporting said connecting member for movement by said gangs and a further connecting member secured by the end thereof to each of said guide means, said connecting members averaging out the movement of said gangs required to operate said means to raise and lower said gangs, said further connecting member being secured intermediate the ends thereof to said means operatively connected between said surface engaging sensing member and said means to raise and lower said gangs.

18. In an earth working agricultural implement which includes a supporting framework and ground engaging wheels supporting said framework, a plurality of spring loaded gangs of furrow opening components mounted in said framework and means to raise and lower said gangs relative to said supporting framework to set the depth of penetration of said components; a depth control device for maintaining said depth penetration, said depth control device comprising in combination at least two surface engaging sensing members mounted upon said framework in spaced apart relationship and extending forwardly of said gangs and a gang movement sensing member operatively connected to at least one of said gangs whereby said gang movement sensing member moves an amount corresponding to the movement of said gangs, means operatively connecting said surface engaging sensing members and said gang movement sensing member together and to said means to raise and lower said gangs whereby (A) movement of said surface engaging sensing members actuates said last mentioned means and (B) movement of said gangs also actuates said last mentioned means, in order to maintain a predetermined setting of said depth penetration of said gangs, means operatively connected between said surface engaging sensing members to average out the vertical movement required to operate said means to adjust said depth of penetration, said means operatively connected between said ground engaging sensing members including a connecting bar secured by one end thereof to one of said surface engaging sensing members and by the other end thereof to the other of said surface engaging sensing members, said means operatively connecting said surface engaging sensing members to said gang movement sensing member being connected to said connecting bar intermediate the ends of said connecting bar.

19. The device according to claim 18 in which said means operatively connecting said surface engaging sensing member and said gang movement sensing member together to said means to raise and lower said gangs, includes at least one switch assembly operatively connected to said means to adjust the depth of penetration of said earth working components, said switch assembly including a first switch for lowering said gangs and hence increasing the depth of penetration and a second switch for raising said gangs and hence decreasing the depth of penetration, and an actuator assembly extending from said surface engaging sensing members for operating said first and second switches responsive to movement of said surface engaging sensing members.

20. The device according to claim 19 in which said actuator assembly includes an operating member secured to said surface engaging sensing members and extending therefrom, said first and second switches being mounted one above the other and including extending spring loaded, normally off, operating plungers extending from one side thereof, a rocker arm pivoted intermediate the ends thereof adjacent said plungers with said ends of said rocker arm in operative contact with said plungers, a lever arm extending from said rocker arm intermediate the ends thereof, upper and lower contactors adjustably secured to said operating member adapted to contact said lever arm and hence operate one or the other of said switches responsive to vertical movement of said surface engaging sensing member.

21. The device according to claim 20 which includes a roller journalled for rotation on the distal end of said lever arm and a roller journalled for rotation on the distal end of each of said contactors.

22. The device according to claim 19 in which said actuator assembly includes an operating member secured to said surface engaging sensing members and extending therefrom, said first and second switches being mounted one above and one below a common plane and having spring loaded, normally off plungers extending downwardly and upwardly therefrom respectively, and an operating arm adjustably secured transversely to said operating member and adapted to contact said plungers and hence operate one or the other of said switches responsive to vertical movement of said surface engaging sensing members.

* * * * *